US009656902B2

(12) United States Patent
Adigrat et al.

(10) Patent No.: US 9,656,902 B2
(45) Date of Patent: May 23, 2017

(54) METHOD OF MANUFACTURING PREFORMS FOR OPTICAL FIBRES HAVING LOW WATER PEAK (71) Applicant: Prysmian S.p.A., Milan (IT)

(72) Inventors: Antonio Adigrat, Milan (IT); Valeria Caronna, Milan (IT); Franco Cocchini, Salerno (IT); Antonio Collaro, Torre del Greco (IT); Stefano Grieco, Milan (IT); Ida Nivelli, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 14/758,011

(22) PCT Filed: Dec. 28, 2012

(86) PCT No.: PCT/EP2012/077039
§ 371 (c)(1),
(2) Date: Jun. 26, 2015

(87) PCT Pub. No.: WO2014/101949
PCT Pub. Date: Jul. 3, 2014

(65) Prior Publication Data
US 2015/0329403 A1 Nov. 19, 2015

(51) Int. Cl.
C03B 37/012 (2006.01)
C03B 37/014 (2006.01)
C03B 37/027 (2006.01)

(52) U.S. Cl.
CPC ...... *C03B 37/0126* (2013.01); *C03B 37/0146* (2013.01); *C03B 37/01446* (2013.01); *C03B 37/01486* (2013.01); *C03B 37/027* (2013.01)

(58) Field of Classification Search
None
See application file for complete search history.

(56) References Cited

U.S. PATENT DOCUMENTS

| 4,579,571 A | 4/1986 | Hicks, Jr. |
| 2002/0083741 A1* | 7/2002 | Pandelisev ............ C03B 17/04 65/416 |

(Continued)

FOREIGN PATENT DOCUMENTS

WO 2010059464 A1 5/2010

OTHER PUBLICATIONS

International Search Report of corresponding International Application No. PCT/EP2012/077039; date mailed: Oct. 4, 2013; 8 pages.

*Primary Examiner* — Lisa Herring
(74) *Attorney, Agent, or Firm* — Shumaker, Loop & Kendrick, LLP (57) ABSTRACT

A method of manufacturing at least one optical fibre preform comprising: providing a plurality of partially porous intermediate preforms, each partially porous intermediate preform having a longitudinal axis and comprising a respective soot intermediate clad layer formed around a respective glass core rod comprising a central core region of radius a and an inner clad region of radius b to define a first core-to-clad ratio a/b; consolidating the formed soot intermediate clad layers to form a respective plurality of intermediate glass preforms, each of the plurality of intermediate glass preforms comprising an intermediate clad region having an external radius c to define a second core-to-clad ratio a/c of from 0.20 to 0.30 , and overcladding at least one intermediate glass preform by forming an overclad region surrounding the intermediate clad region to form an optical fibre glass preform, wherein consolidating comprises exposing the plurality of intermediate preforms to a consolidation hot zone of a single furnace body while rotating each of the intermediate preforms about its respective longitudinal axis.

12 Claims, 8 Drawing Sheets

(56) References Cited

U.S. PATENT DOCUMENTS

| | | | | |
|---|---|---|---|---|
| 2002/0186942 A1* | 12/2002 | Bubnov | ............ | C03B 37/01807 385/123 |
| 2007/0125129 A1* | 6/2007 | Dayanandan | ..... | C03B 37/01446 65/414 |
| 2010/0122558 A1* | 5/2010 | Jewell | ................. | C03B 37/0146 65/427 |

* cited by examiner

METHOD OF MANUFACTURING PREFORMS FOR OPTICAL FIBRES HAVING LOW WATER PEAK

FIELD OF INVENTION

The present invention relates to a method of manufacturing an optical fibre preform and an apparatus thereof and in particular to a method of manufacturing a preform for optical transmission fibres having low water peak.

RELATED ART

Wavelength division multiplexing (WDM) technology and the more recent dense wavelength division multiplexing technology (DWDM) have pushed manufacturers of optical transmission fibres to produce fibres having a very small optical attenuation across a broad wavelength region of the transmission spectrum. A particular problem that has been dealt with in the last decade is the attenuation due to the absorption by the optical fibre, during its manufacturing, of hydroxyl radicals (—OH) and/or $H_2O$ molecules present in the optically active region of the fibre. The —OH groups and water can be formed during manufacturing of optical fibre preforms when the latter are exposed to hydrogen, which can be available from various sources. Contamination from hydroxyl radicals or water causes a linear attenuation at 1380 nm, visible in the attenuation spectrum as a peak generally referred to as the "water peak".

A common procedure to obtain a glass preform to be drawn down to an optical fibre of typical diameter of about 125 μm comprises a first process for producing a core rod of solid glass, also indicated as core cane, and a second process in which an overcladding is added to the core rod by a suitable process, e.g. by deposition of soot about the core rod or by jacketing the core rod in a glass tube (rod-in-tube—RIT-technology).

WO 01/47822 relates to a method of fabricating a cylindrical glass body for use in manufacturing an optical fibre with low water peak, the method comprising the steps of: forming a consolidated glass precursor body for use in manufacturing an optical fibre preform, said precursor body comprising at least a partial core region of said preform; exposing said glass precursor body to deuterium gas, and forming additional cladding on said precursor body to form an optical fibre preform. The precursor body is a glass core cane comprising a core region and at least a portion of the glass cladding region. Prior to additional overclad soot being added to the core cane, the core cane is suspended within a furnace and treated with deuterium for a time and temperature which is sufficient to prevent rewetting of the consolidated glass core cane.

The soot precursor body, especially when made by outside vapour deposition (OVD), vapour axial deposition (VAD), typically has a core region surrounded by a near clad region, also indicated as inner clad region, often made of pure silica. Optionally the inner cladding region comprises one or more layers of doped silica. The resultant precursor body is then dried and consolidated to form a core glass body. A stretching often follows the consolidation in order to reduce the diameter of the glass body which is then severed into a plurality of core rods. Alternatively core rods may also be made by inside deposition processes such as Modified, or Furnace Chemical Vapour Deposition (MCVD/FCVD), or Plasma Chemical Vapour Deposition (PCVD).

A parameter that is often used as indicative of the cost and performance of the produced optical fibre is the core-to-clad ratio of a glass core rod, a/b, where a is the radius of the core region of the core rod and b is the external radius of the inner clad region surrounding the core region. The larger the value of a/b, the higher can be the yield of the manufacturing process since more core rods can be obtained from a single soot preform.

US 2011/0023551 discloses a method of fabricating core rod sections useable for the production of finished optical fibre preforms. The method is said to allow an increase of the cladding to core ratio, indicated with D/d. The disclosed method comprises inserting two or more core body pieces end-to-end axially inside a glass cylinder, thereby defining joints between adjacent ones of the inserted core body pieces; mounting the glass cylinder with the contained core body pieces vertically in a region of a furnace; heating the glass cylinder and core body pieces together in the furnace, thereby elongating the cylinder and the core body pieces contained in the cylinder; collapsing the elongated cylinder so as to form a finished core rod; and cutting the finished core rod at one or more positions along the length of the core rod that coincide with the joints between adjacent ones of the core body pieces, thereby yielding a number of core rod sections one or more of which are useable for the production of optical fiber preforms. The core body pieces have a D/d of four or less, whereas the finished core rod is formed with a D/d ratio of more than five.

WO 2012/010212 describes a bend-resistant optical fibre having a core region and a cladding region surrounding the core region and comprising a void-containing annular layer doped with fluorine. The fluorine doping can be performed during the consolidation process following a soot deposition of a silica layer over the core blank of a preform.

Although the RIT process is sometimes preferred because it less prone to the introduction of hydrogen contamination at the interface between the core rod and the overcladding, a direct overcladding by soot deposition can significantly reduce manufacturing costs when compared to a RIT process.

Formation of a cladding region on the core rod by a flame hydrolysis deposition process, such as by OVD, is often preferred because it allows a relatively fast process of producing an soot optical preform from a core rod.

Porous soot preforms are subsequently treated with a drying agent to remove water and they are then consolidated (or sintered) inside a furnace into a dense glass preform at temperatures higher than the glass transition temperature.

WO 2010/059464 describes a method of consolidating a soot containing optical fibre preform in consolidation furnace by exposing the soot preform to a reduced pressure less than the atmospheric pressure while simultaneously exposing the preform to a temperature sufficient to fully consolidate the preform into a void-free preform. The document mentions that, instead of a single preform, multiple preforms can be consolidated in the same furnace via multiple preform supports.

SUMMARY OF THE INVENTION

Inventors have realised that an optical fibre with low water peak can be obtained from a core rod with a large core-to-clad ratio by carrying out an intermediate cladding process, in which an intermediate glass preform having a second core-to-clad ratio smaller than the first core-to-clad ratio is formed, and then completing the cladding to form an optical fibre preform.

Cladding the core rod by forming an intermediate clad region of relatively small thickness compared to the thickness of the total clad region of the optical fibre preform allows the use of core rods with relatively large core-to-clad ratios.

Inventors have understood that deposition, preferably by a flame hydrolysis process, of a relatively low amount of soot material around the core rod followed by consolidation of the deposited soot material and by completion of formation of the cladding leads to the manufacture of an optical fibre preform from which a low water peak fibre is obtained.

Inventors have observed that, while the overall efficiency depends on the a/b ratio of the core rod, which in turn and for core rods obtained by stretching of a core preform, depends on the number of core rods obtained from a single core preform, two consolidation processes are needed for the complete cladding of the core rod and thus for the formation of a final optical fibre preform. The crossover time to complete an optical fibre preform may therefore significantly increase with respect to a process in which the final preform is obtained by forming a single cladding layer on the core rod.

Inventors have found that an optical fibre with a low water peak can be obtained from an optical fibre preform produced with a two-stage cladding process and a relatively high throughput by a method in which multiple intermediate soot preforms are simultaneously consolidated.

The intermediate glass preform has a core-to-clad ratio of from 0.20 to 0.30, preferably of from 0.20 to 0.25.

The core-to-clad ratio of the core rod, i.e. a/b, is referred in the following to as the first core-to-clad ratio, whereas the core-to-clad ratio of the intermediate glass preform (a/c) is referred to as the second core-to-clad ratio.

Preferably, the core rod has a core-to-clad ratio equal to or larger than 0.34, more preferably equal to or larger than 0.38. According to some preferred embodiments, the core-to-clad ratio of the core rod is equal to or smaller than 0.40.

According to an aspect consistent with the present disclosure, a method of manufacturing an optical fibre preform is provided, the method comprising:
  providing a plurality of partially porous intermediate preforms, each partially porous intermediate preform having a longitudinal axis and comprising a respective soot intermediate clad layer formed around a respective glass core rod comprising a central core region of radius a and an inner clad region of external radius b to define a first core-to-clad ratio a/b;
  consolidating the formed soot intermediate clad layers to form a respective plurality of intermediate glass preforms, each of the plurality of intermediate glass preforms comprising an intermediate clad region of external radius c to define a second core-to-clad ratio a/c of from 0.20 to 0.30, and
  overcladding at least one intermediate glass preform by forming an overclad region surrounding the intermediate clad region to form an optical fibre glass preform, wherein consolidating comprises exposing the plurality of intermediate preforms to a consolidation hot zone of a single furnace body while rotating each of the intermediate preforms about its respective longitudinal axis.

Preferably, the furnace body comprises a vertically oriented muffle extending along a furnace longitudinal direction, the consolidation hot zone being a vertical hot zone.

Preferably, each glass core rod has an outer surface and the soot intermediate clad layer is a silica soot layer deposited on the outer surface of the respective glass core rod.

In some preferred embodiments, the method comprises, before consolidating, operatively connecting the plurality of partially porous intermediate preforms to a respective plurality of holding shafts comprised in a support structure comprising a support member, each of the holding shafts being rotatably engaged to the support member.

Preferably, the plurality of holding shafts are arranged peripherally with respect to a drive shaft transmitting rotation to the holding shafts by means of a slave driving mechanism.

According to some embodiments, before consolidating, the method further comprises: operatively connecting the plurality of partially porous intermediate preforms to a respective plurality of holding shafts comprised in a support structure comprising a drive shaft transmitting rotation to the holding shafts by means of a rotation transmission mechanism. Preferably, the rotation transmission mechanism transmits rotation from the drive shaft to the holding shafts by means of a slave driving mechanism. Preferably, the support structure comprises a support member, each of the holding shafts being rotatably engaged to the support member.

Preferably, the holding shafts are geared shafts disposed concentrically around the drive shaft. Preferably, the holding shafts are interlocked with a respective slave gear meshing with a master gear interlocked with the drive shaft.

Preferably, the furnace body is vertically oriented and consolidating comprises simultaneously moving the plurality of intermediate preforms relative to the consolidation hot zone along a longitudinal direction of the furnace. Preferably, the consolidation hot zone of the furnace is held at a temperature of from 1400° C. to 1600° C.

In some embodiments, exposing to a consolidation hot zone comprises simultaneously lowering the partially porous intermediate preforms into the consolidation hot zone of the furnace body, in which the partially porous preforms are vitrified into a plurality of glass intermediate preforms.

In some preferred embodiments, the method further comprises, before consolidating, drying the plurality of intermediate preforms, wherein drying comprises exposing the plurality of intermediate preforms to a dehydration hot zone of the furnace while rotating each of the intermediate preforms about its longitudinal axis. Preferably, the furnace body is vertically oriented along a furnace longitudinal direction and the dehydration hot zone is positioned at a first longitudinal section of the furnace body positioned upwards a second longitudinal section corresponding to the consolidation hot zone.

Preferably, during consolidation, rotating each of the intermediate preforms comprises uniformly rotating the intermediate preforms at an equal rotational speed.

In some preferred embodiments, providing a plurality of partially porous intermediate preforms comprises:
  providing a respective plurality of glass core rods, each glass core rod having a first core-to-clad ratio a/b, and
  depositing soot material around each glass core rod by a flame hydrolysis process to form a soot intermediate clad layer surrounding the inner clad region.

Preferably, each glass core rod has an outer surface and the soot material for the formation of the intermediate clad layer is silica soot deposited on the outer surface of the respective glass core rod. Preferably, the soot material is pure silica soot. Preferably, the flame hydrolysis deposition process is an outside vapour deposition process.

In some preferred embodiments, overcladding the intermediate glass preform comprises:
depositing soot material around the intermediate glass preform by a flame hydrolysis process to form a soot overclad layer, and
consolidating the soot overclad layer so as to form an optical fibre preform.

Preferably, the soot material for the formation of the overclad layer is silica soot, more preferably made of pure silica. Preferably, the flame hydrolysis deposition process is an outside vapour deposition process.

A further aspect consistent with the present disclosure is directed to an apparatus for consolidating a plurality of partially porous preforms into a respective plurality of glass preforms for the production of at least one preform for optical fibres, the apparatus comprising:
a furnace body comprising a vertically oriented muffle configured to house a plurality of partially porous preforms in a vertical orientation, the furnace body being thermally coupled to a consolidation heater to heat a vertical consolidation hot zone of the muffle;
a support structure configured to support the plurality of partially porous preforms in a vertical orientation and comprising a drive shaft;
a vertical driving device being operatively connected to the support structure and being designed for vertically moving the support structure thereby lowering the preforms through the consolidation hot zone of the furnace body and being designed for imparting rotation to the drive shaft,
wherein the support structure comprises a plurality of holding shafts configured to be operatively connected to the plurality of preforms and a rotation transmission mechanism transmitting rotation from the drive shaft to the holding shafts by means of a slave driving mechanism.

Preferably, the rotation transmission mechanism comprises a master gear interlocked with the drive shaft and a plurality of slave gears, each gear being interlocked with a respective holding shaft of the plurality of holding shafts and meshing with the master gear so that rotation of the drive shaft is transmitted to the holding shafts.

Preferably, the support structure further comprises a support member, the driving shaft and the plurality of holding shafts being rotatably engaged to the support member.

Optical fibres obtained from optical fibre preforms realised by the method consistent with some embodiments of the present disclosure exhibited attenuation at 1383 nm of less than 0.30 dB/km.

BRIEF DESCRIPTION OF THE DRAWINGS

The present invention will now be described in more detail hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

The optical fibre preform to be obtained by the method consistent with the present disclosure is preferably used for the manufacturing of a single-mode optical fibre suitable for optical transmission systems.

According to some preferred embodiments consistent with the present disclosure, the method is intended to produce optical fibre preforms for single-mode optical fibres having a mode field diameter (MFD) at 1310 nm of 8.6 to 9.5 µm with a manufacturing tolerance of ±0.6 µm, meeting the specifications of some common standards ITU-T for single mode optical transmission, such as G. 652. More preferably, optical fibre preforms are to produce single mode optical fibres with MFD of 9.0±0.6 µm.

Figure 1:
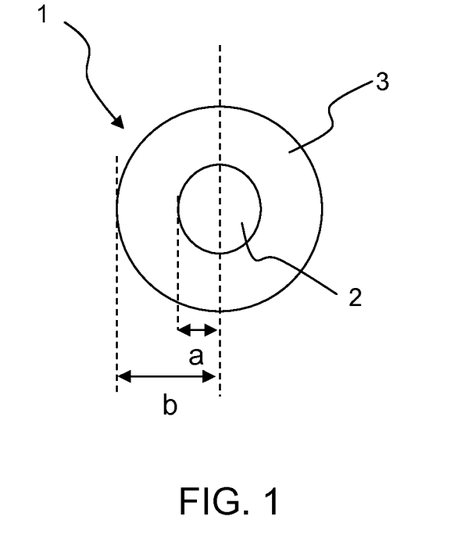
FIG. 1 is a schematic diagram of a cross-sectional view of a glass core rod with first core-to-clad ratio a/b.

In the method of manufacturing an optical fibre preform consistent with the present disclosure and according to some preferred embodiments, a core rod of solid glass is provided, wherein the core rod comprises a central core region and an inner clad region surrounding the core region. FIG. 1 is a schematic diagram of a cross-sectional view of a glass core rod 1 comprising a central core region 2 of radius a and a surrounding inner clad region 3 of external radius b. In an embodiment, the inner clad region 3 surrounds and is in contact with core region 2.

A large core-to-clad ratio (a/b) of the glass core rod 1 would offer advantages in terms of manufacturing efficiency and yield. However, the inventors have experimentally observed that optical fibres made from OVD core rods having a/b larger than 0.34, if completed by a direct soot overcladding by OVD, exhibit an optical attenuation at 1380-1383 nm of more 0.34 dB/km, a value non compliant with some of the ITU-T Recommendations for single-mode transmission.

Inventors have realised that an optical fibre with a low water peak can be obtained from a core rod having a large first core-to-clad ratio by using a multi-stage cladding process, in which in a first stage an intermediate glass preform having a second core-to-clad ratio smaller than the first core-to-clad ratio is formed and a second stage completes the overcladding to form an optical fibre preform. The intermediate glass preform comprises an intermediate clad region surrounding the inner clad region of the core rod. Cladding the core rod by forming an intermediate clad region of relatively small thickness compared to the thickness of the total clad region of the optical fibre preform allows the use of core rods with relatively large core-to-clad ratios.

With reference to FIG. 1, the core rod preferably has a first core-clad-ratio, a/b, equal to or larger than 0.34, preferably larger than 0.38. Preferably, a/b is equal to or smaller than 0.4. In some preferred embodiments, a/b is of from 0.34 to 0.4.

Preferably, radial thickness of the intermediate clad layer is selected so as to obtain a second core-to-clad ratio, a/c, of from 0.20 to 0.30, where c is the external radius of the intermediate clad region, more preferably a/c is of from 0.20 to 0.25.

A second core-to-clad ratio smaller than 0.20 may exhibit the shortcomings of forming a excessively thick soot layer around the core rod, namely a significant presence of water contamination in the proximity of the outer surface of the core rod.

In some embodiments, an a/c ratio not larger than 0.25 may reduce environmental impact of the optical fibre production because in the formation of the final optical preform, a dehydration process of the overclad soot can be shortened or, under certain circumstances, omitted and/or efficiency of the deposition process of the overclad soot region can be increased by allowing a higher deposition rate, for example by using more than one burner.

Preferably, the glass core rod is made of a silica-based material. Preferably, the core region has a positive relative refractive index with respect to the refractive index of silica and it is preferably made of silica doped with a doping element that increases the refractive index, such as germanium, so as to form a step-index profile with positive refractive index relative to pure silica. It is to be understood that a glass core rod with a core region having a step profile, rounded-step profile, an alpha profile or being made of a plurality of sub-regions having positive relative refractive index are intended to be included within the scope of the present disclosure. In some embodiments, the core profile may exhibit a central dip surrounded by a region of relative positive refractive index.

In some embodiments, the core profile is selected so as to obtain an optical fibre having a MFD at 1310 nm of 9.0±0.6 μm.

The inner clad region has a lower index of refraction than the central core region and is made preferably of non intentionally doped silica, which is referred in the present description and claims to as pure silica.

In an embodiment, the glass core rod is obtained from a soot preform formed using a flame hydrolysis deposition process, preferably an OVD process, the preform being then sintered to form a core rod of solid glass. Other flame hydrolysis processes can be used to form the core rod, such as vapour-phase axial deposition (VAD).

In another embodiment, the glass core rod is obtained from an inside vapour deposition process, preferably a process selected from the group consisting of modified chemical vapour deposition (MCVD), furnace chemical vapour deposition (FCVD), and plasma-enhanced chemical vapour deposition (PCVD).

Figure 2:
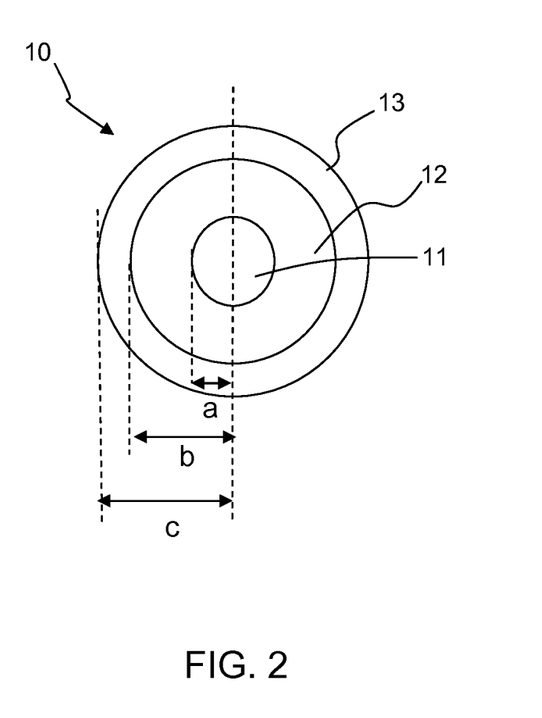
FIG. 2 is a schematic diagram of a cross-sectional view of intermediate glass preform with second core-to-clad ratio a/c.

FIG. 2 is a schematic diagram of a cross-sectional view of an intermediate glass preform 10 comprising a central core region 11 of radius a, an inner clad region 12 of external radius b and an intermediate clad region 13 with external radius c.

In a preferred embodiment, the intermediate clad region is made of pure silica.

Preferably, the intermediate clad region surrounds and is in contact with the inner clad region of the core rod.

The intermediate clad region is made by direct soot coating of a soot intermediate clad layer over the core rod. Preferably, deposition of a soot intermediate layer is realised by a flame hydrolysis process of silica-based soot over the core rod. In an embodiment, the core rod is mounted on an OVD horizontal lathe and silica soot is deposited on the outside of a rotating core rod acting as a mandrel in a standard OVD process.

In some preferred embodiments, soot material deposited for the formation of the intermediate clad region varies from about 5% to less than 15% of the total soot material necessary for the cladding of the core rod in order to form an optical fibre preform. Inventors have found that deposition by flame hydrolysis of a relatively low amount of soot material around the core rod followed by consolidation of the deposited soot material leads to the manufacture of an optical fibre preform from which a low water peak fibre is obtained.

Without wishing to be bound by any theory or explanation, it is thought that a small amount of soot clad material for the formation of the intermediate clad region can allow an efficient removal of the —OH impurities from the outside surface of the core rod and/or (re)-wetting of the very external layers of the core rod can be reduced due to the relatively short deposition.

Following the soot deposition of an intermediate clad layer on the core rod, the intermediate soot preform undergoes a consolidation process. Consolidation of the partially porous intermediate preform comprises exposing the preform to temperatures higher than the glass transition temperature of the soot material in a consolidation furnace to convert the deposited external soot layer into solid glass. Preferably, consolidation is preceded by a dehydration or drying step of the partially porous intermediate preform in which the preform is exposed to an atmosphere containing a drying reagent, such as a chlorine or fluorine.

Subsequently, to complete the manufacturing of an optical fibre preform, an overcladding region is formed on the intermediate glass preform. Preferably, a soot overclad layer is formed by depositing soot material on the outer circumference of the intermediate glass preform. The obtained partially porous preform undergoes a consolidation process to form a glass preform for an optical fibre.

Inventors have observed that, while the overall efficiency depends on the a/b ratio of the core rod, which in turn, for core rods obtained by stretching of a core preform, depends on the number of core rods obtained from a single core preform, two consolidation processes are needed for the complete cladding of the core rod and thus for the formation of a final optical fibre preform. The crossover time to complete an optical fibre preform may therefore significantly increase with respect to a process in which the final preform is obtained by forming a single cladding portion on the core rod.

Inventors have realised that an optical fibre with a low water peak can be obtained from an optical fibre preform produced with a two-stage cladding process and a relatively high throughput by a method in which multiple intermediate soot preforms are simultaneously consolidated.

Figure 3:
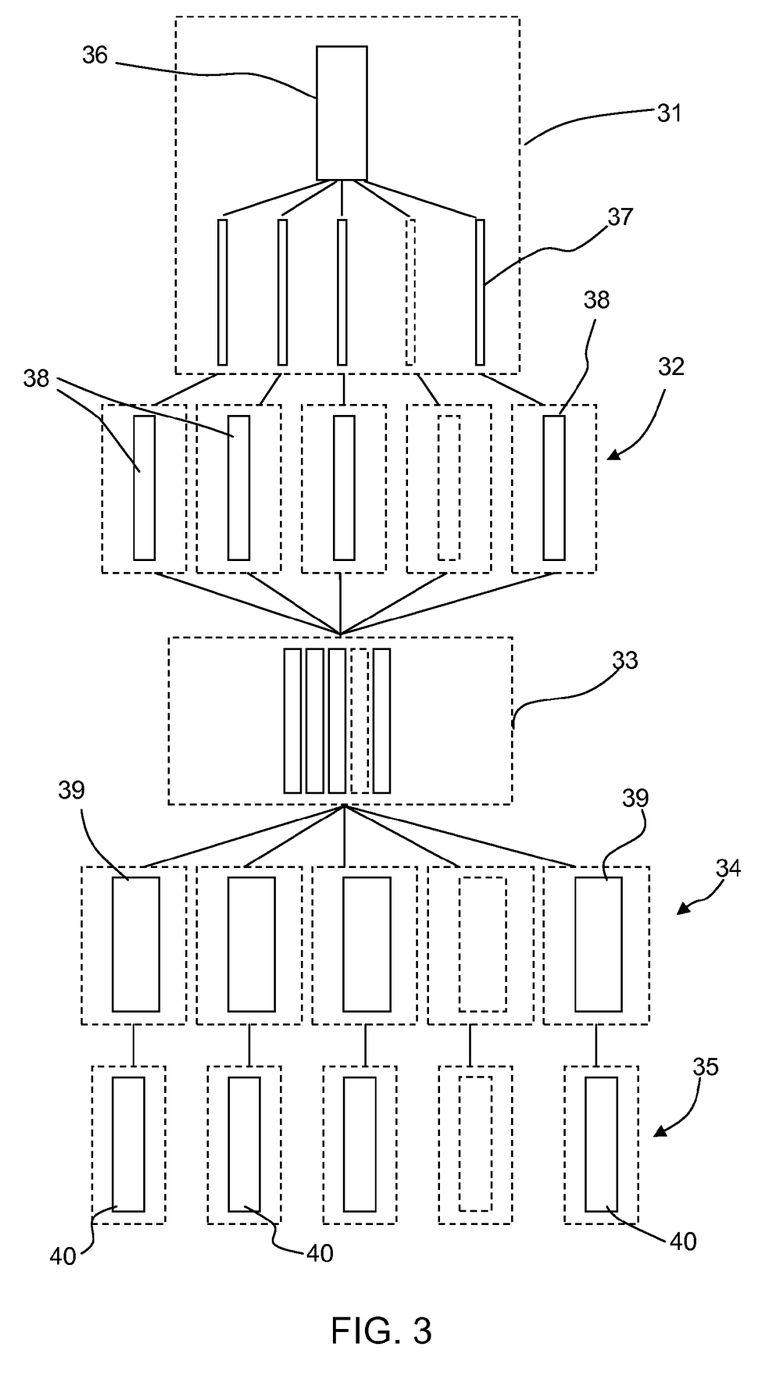
FIG. 3 is a flow diagram schematically representing the main phases of a method of manufacturing an optical fibre preform in an embodiment consistent with the present disclosure.

FIG. 3 is a flow diagram schematically representing the main phases of a method of manufacturing an optical fibre preform in an embodiment consistent with the present disclosure. In stage 31, a soot core preform 36, produced for example by OVD, VAD or PCVD, is consolidated to form a glass core preform and preferably stretched. The stretched glass core preform is then severed in a plurality of glass core rods 37, exemplified by five core rods in the figure, the number shown being however not limitative. A soot intermediate clad layer is deposited on each glass core rod to obtain a plurality of partially porous intermediate preforms 38 (stage 32). The plurality of partially porous intermediate preforms are simultaneously processed in a consolidation furnace to obtain a plurality of glass intermediate preforms (stage 33). Subsequently, a soot overclad layer is deposited on each of the glass intermediate preform so as to form a respective partially porous preform (stage 34), which is then consolidated (stage 35) to form a glass optical fibre preform 40. The glass optical fibre preform can then be mounted on a drawing tower and drawn to obtain an optical fibre.

A typical soot core preform obtained by OVD may have for example an external diameter of 200 mm. The diameter of glass core rods, following consolidation and optionally stretching of the soot core preform, with an a/b value of 0.34 may present a typical value of from 15 mm. Deposition of soot material on a glass core rod for the formation of a soot intermediate layer increase the diameter to values that may exemplary range from about 25 to 50 mm, for a/c of from 0.20 to 0.30.

The Applicant has observed that, if in step 33 at least three intermediate preforms are simultaneously subjected to consolidation, the throughput of the manufacturing process from the provision of glass core rods to the formation of respective optical fibre preforms can be analogous to that of the formation of final preforms from glass core rods by using a single-stage cladding and standard consolidation.

A single soot preform generally rotates about its axis during consolidation to achieve uniform heat treatment. In order to simultaneously process a plurality of intermediate preforms, the inventors have considered a support structure having a main shaft which rotates about a main longitudinal axis and being configured so as to induce the rotation of the plurality of intermediate preforms about the same axis, i.e. the main axis, as shown in FIG. 4a.

Figure 4A:
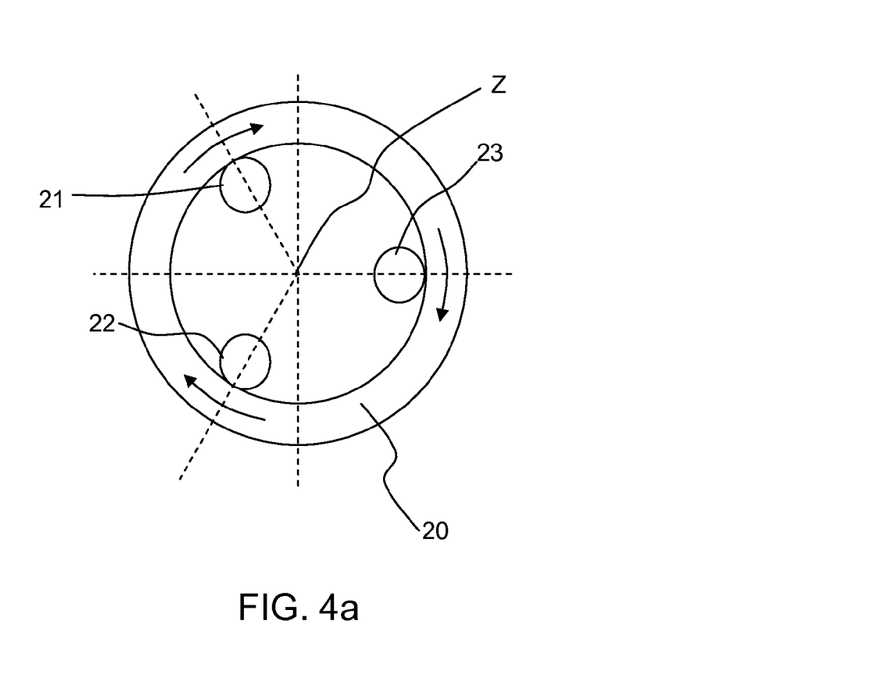
FIG. 4a is a schematic plan view showing the rotation of a plurality of preforms about a common axis.

FIG. 4a is a schematic and partial plan view showing a plurality of intermediate preforms 21, 22, 23, which are in the example in the number of three and placed at 120° one from another, rotating about a common axis Z. For example, the intermediate preforms are non-movably albeit removably secured onto a common horizontal plate 20 rotating about Z. Inventors have experimented a dehydration and consolidation process using a rotating mechanism of the type shown in FIG. 4a and they have observed that, at the end of the consolidation stage, the intermediate preforms were significantly bent. Optical fibre preforms formed from bent intermediate preforms yield to fibres with an unacceptable large core-clad concentricity. Bending of the intermediate preforms was thought to be caused by an asymmetric temperature field experienced by the preforms.

Figure 4B:
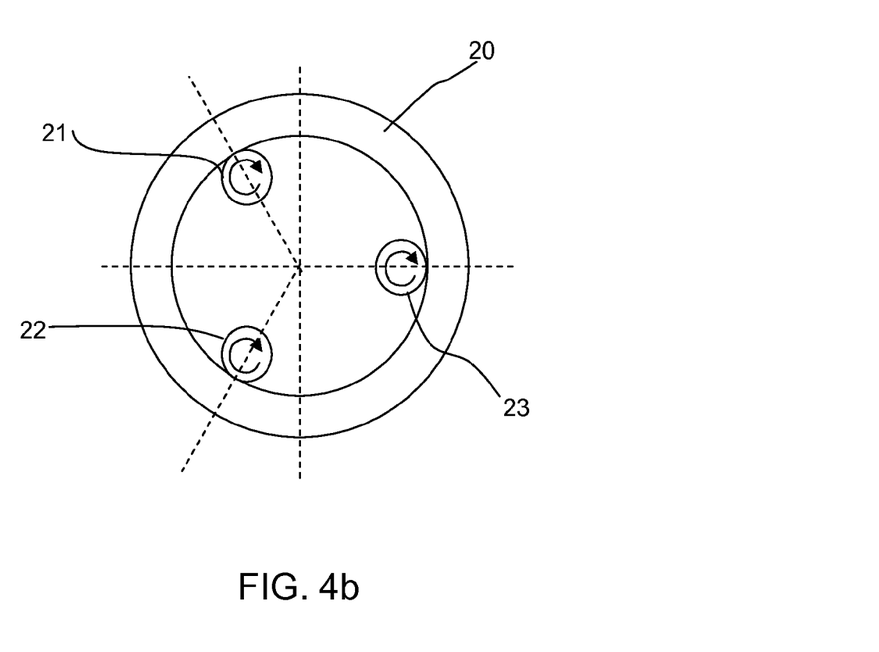
FIG. 4b is a schematic plan view showing the rotation of a plurality of preforms about their own axis.

Inventors have understood that each intermediate preform of the plurality needs to rotate about its own longitudinal axis in order to face uniformly all of its sides to the inner surface of the furnace. A schematic and partial plan view showing the rotation of a plurality of intermediate preforms 21, 22, and 23 about their own axis is given in FIG. 4b. Intermediate preforms can be rotatably secured on a common horizontal plate 20.

Figure 5:
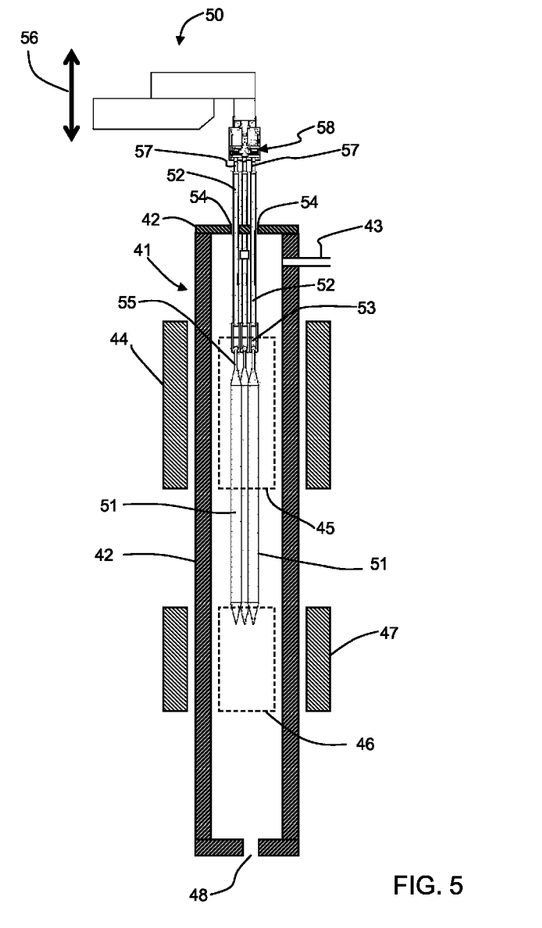
FIG. 5 is a lateral view of an apparatus for consolidation of a plurality of intermediate soot preform with some parts shown in cross-sectional view to better highlight some details of the apparatus, in accordance with an embodiment consistent with the present disclosure.

FIG. 5 is a lateral view of an apparatus for consolidation of a plurality of intermediate soot preform with some parts shown in cross-sectional view to better highlight some details of the apparatus, in accordance with an embodiment consistent with the present disclosure. A plurality of partially porous intermediate preforms 51 (three are visible in the figure) are processed in a dehydration and consolidation furnace assembly 41, which is shown in a partial transverse cross-sectional view. The partially porous intermediate preforms have a respective longitudinal axis. The furnace assembly comprises a furnace body 42, configured to house elongated preforms and having a gas inlet opening 48 for the supply of carrier gases, which are discharged from an outlet 43. The furnace body 42 extends along a furnace longitudinal direction and it is vertically oriented so that the furnace longitudinal axis is parallel to the downfeed direction for the translational movement of the preforms along the furnace body. The furnace body is preferably a vertical muffle, more preferably of cylindrical shape, having an inner surface.

Each partially porous intermediate preform 51 is suspended by a respective support handle 53 connected and/or interlocked to a lower end of a respective supporting rod 52, for example a hook-on handle engaging a preform handle 55 attached to one end of the preform or being an integral part of the preform. The plurality of supporting rods 52 enter the cavity of the furnace body through a respective hole 54 in a top hat 42 that acts as closure lid of the main furnace body so that, when the preforms are completely inserted, as shown in the figure, the top hat 42 prevents gases and heat from leaking out from the top of the furnace main body. Only two holes 54 are visible in the cross-sectional view of the furnace of FIG. 5. The upper end of each supporting rod 52 is operatively connected to a support structure 58, which will be described in more detail in FIGS. 6 and 7, in accordance to a preferred embodiment.

A conventional vertical driving device or downfeed system 50 is operatively connected to the support structure 60 and imparts to the support structure 58 a translational movement (up and down, as indicated by arrow 56 in FIG. 5) along the furnace body, for example by means of a guide and a translational transfer mechanism. A rotation around a longitudinal axis parallel to the downfeed direction is imparted from a motor mounted on the vertical driving device to a plurality of holding shafts 57 comprised in the support structure, which are operatively connected to the connecting rods 52, for example each holding shaft is removably interlocked with a respective connecting rod. Rotational movement is transferred from the rotating holding shafts 57 to the intermediate preforms 51.

Figure 6:
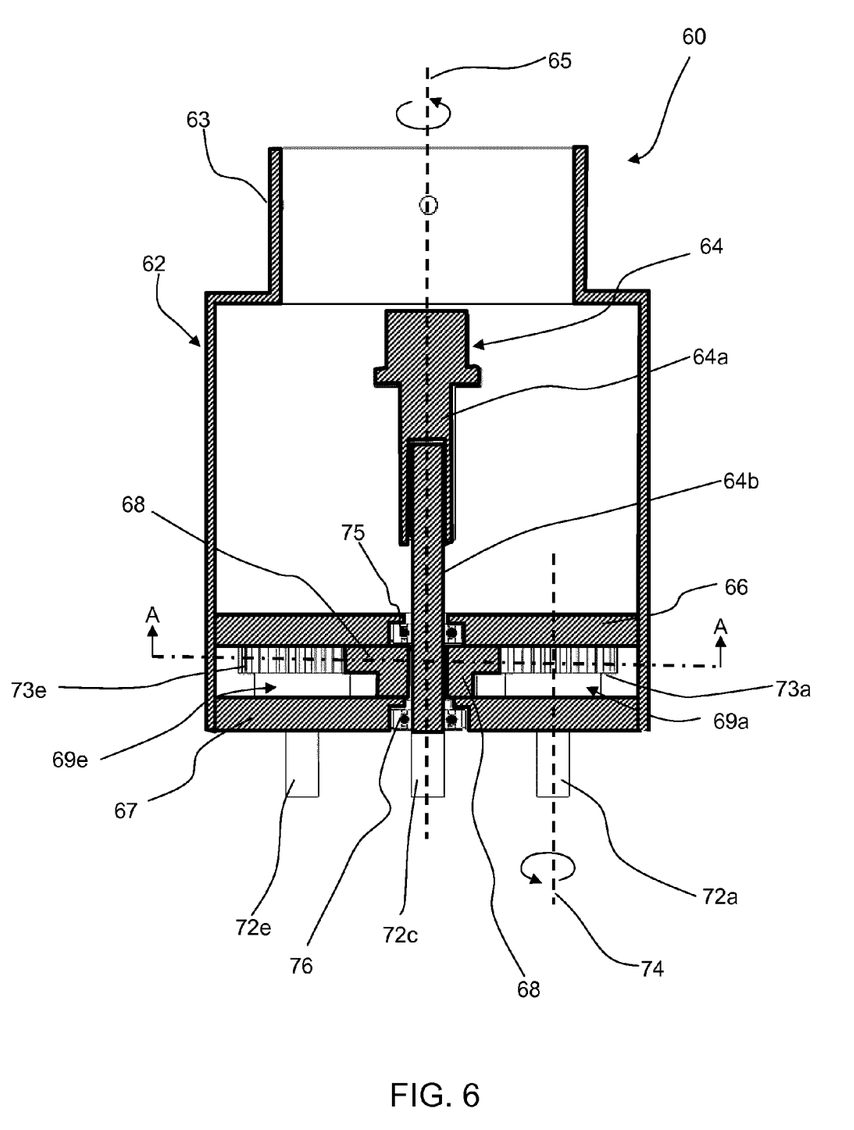
FIG. 6 is a cross-sectional view of a support structure in accordance to an embodiment consistent with the present disclosure.
Figure 7:
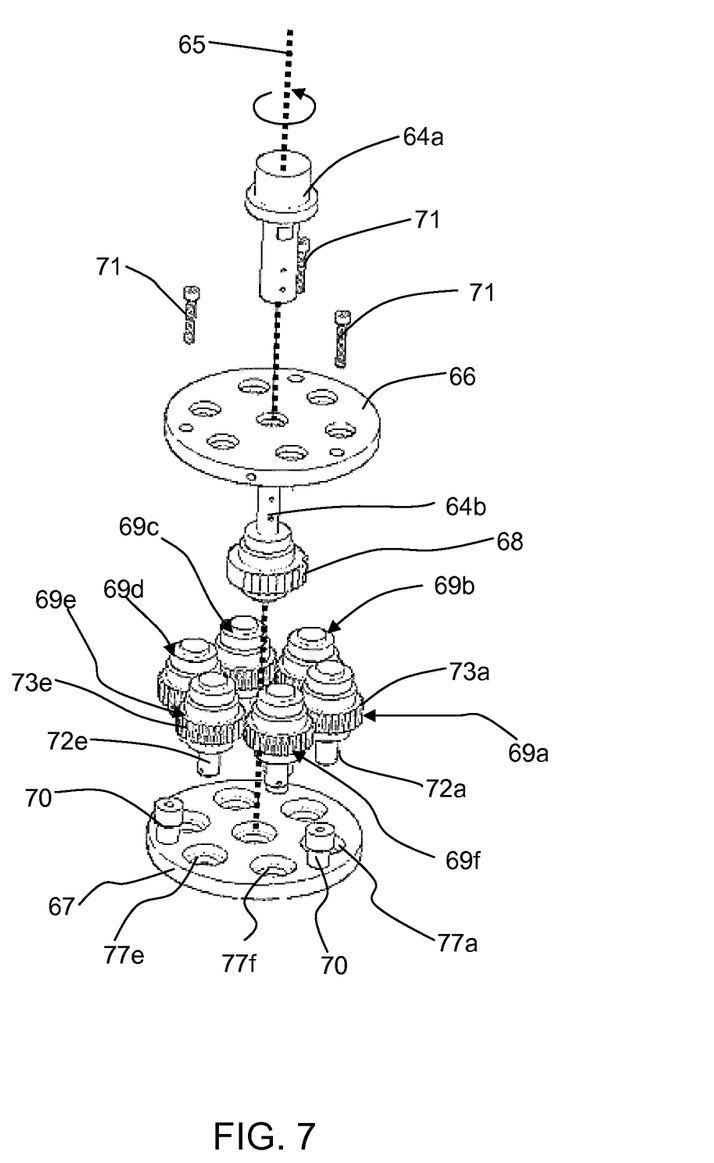
FIG. 7 shows an exploded view of the support structure of FIG. 6 in which the case of the support structure has been omitted in order to improve clarity.

FIG. 6 is a cross-sectional view of the support structure 60 shown in FIG. 5, in accordance to an embodiment consistent with the present disclosure. FIG. 7 shows an exploded view of the support structure in which the case of the structure has been omitted in order to improve clarity. The support structure 60 comprises a case 62 having un upper portion 63 configured to engage with a vertical driving device in a conventional way. For example, in a manner per se known, the upper portion 63 of the case engages by means of an interlocking fit (not shown) to a translation guide of the vertical driving device to provide for the translational movement of the support structure and thus of the intermediate preforms. The support structure is provided with a drive shaft 64 connected for rotation about a longitudinal axis 65 to a rotational mechanism included in the vertical driving device and per se known (vertical driving device not shown in FIGS. 6 and 7). In the embodiment of FIGS. 6 and 7 the drive shaft is made of two interlocked shaft portions 64a and 64b. However, the shown drive shaft's structure should not be construed in any limitative sense. The upper shaft portion 64a is configured to engage with a rotational mechanism of the vertical driving device, for example a motor drives the rotation of the translational guide of the vertical driving device, which is then imparted to the drive shaft 64. The lower end of the drive shaft 64, i.e. the lower end of shaft portion 64b, is interlocked to a master gear 68 which can then rotate about the drive shaft's axis 65. Preferably, the drive shaft's axis corresponds to the downfeed direction of translational movement of the support structure 60 and thus of the preforms along the furnace body.

The master gear 68 meshes with a plurality of geared holding shafts 69a, 69b, . . . , 69f arranged circumferentially around the drive shaft 64. Each holding shaft is interlocked with a respective slave gear or geared portion 73a, 73b, . . . , 73f, which is arranged at the upper or middle portion of the holding shaft in such a way that a lower portion 72a, . . . , 72f of the respective holding shaft extends below the respective slave gear. The lower portion of each holding shaft acts as a connecting portion for a connecting rod engaging the handle of an intermediate preform (not shown in FIGS. 6 and 7) so that each holding shaft is operatively connected to the respective intermediate preform. For example, each slave gear is directly mounted on the respective shaft or it is an integral part of the holding shaft. Mechanical connection between the lower portion of the holding shafts and the respective connecting rod can be of conventional type, for example by means of connecting elements (e.g. mechanical joints or chucks) provided in both the holding shaft and the connecting rod, and can be of removable type.

The master gear has cut teeth meshing with the teeth of each of the slave gears. In the embodiment of FIGS. 6 and 7 the number of holding shafts is six, this number being however not to be interpreted in a limitative way.

The lower portion 64b of the drive shaft is rotatably engaged to a upper support plate 66 and to a lower support plate 67 in such a way that the master gear is secured between the plates, which are horizontal with respect to the drive shaft. In the embodiment, each of the upper and lower support plate 66 and 67 has a respective central mounting hole through which the drive shaft 64 (lower portion 64b) is inserted and engaged to the support plates through a respective ball bearing 75 and 76 contacting the outer surface of the drive shaft (visible in FIG. 6).

The holding shafts are rotatably engaged to the lower supporting plate 67. To this end and in the present embodiment, the lower support plate is further provided with a plurality of peripheral mounting holes 77a, 77b, . . . , 77f (visible in FIG. 7) through which the lower portions 72a, . . . , 72f of the respective holding shafts are inserted and rotatably engaged by means of respective ball bearings (not shown in the figures). Preferably, the holding shafts are rotatably engaged also to the upper supporting plate 66, which is provided with a plurality of peripheral mounting holes aligned with the peripheral mounting holes of the lower support plate 67. In particular, the holding shafts are engaged to the upper support plate through their respective upper end above the slave gear.

Master gear and slave gears are co-axially secured between the upper and lower support plates 66 and 67 by means of securing elements, such as screws 71, which fix one to another the support plates. Upper and lower support plates are spaced apart by a plurality of spacers 70. The upper and lower support plates form a supporting member comprised in the support structure for the holding shafts and the drive shaft.

The master gear transmits the rotational motion of the drive shaft to the each of the plurality of slave gears so that all holding shafts rotate in the same direction about an axis parallel to the axis 65 of the drive shaft, the rotational direction of the slave gears being opposite to the rotational direction of the drive shaft due to the meshing between the master gear and the slave gears. Axis 74 of geared holding shaft 69a is indicated in FIG. 6 with an arrow indicating the rotational direction.

Figure 8:
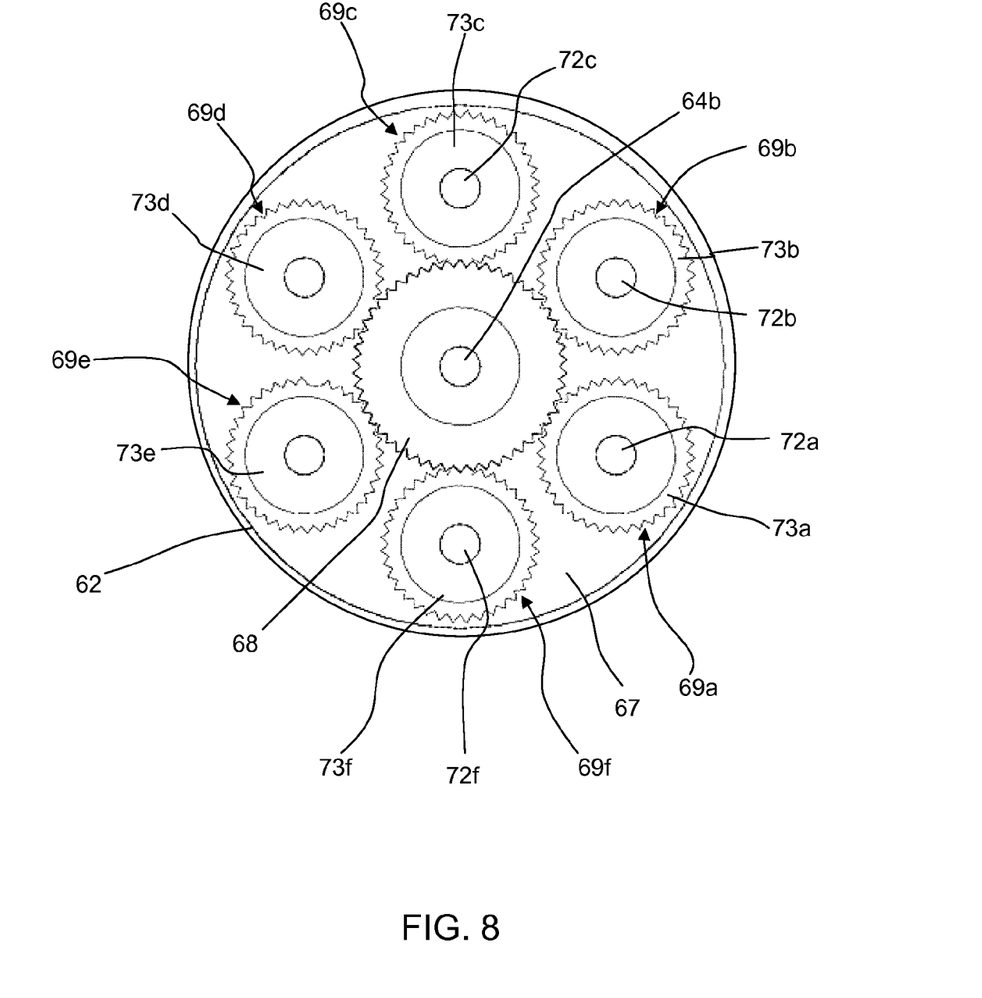
FIG. 8 is a plan view of the support structure of FIG. 6 showing the meshing between the master gear and the slave gears.

Meshing between the master gear and the slave gears is shown in some more detail in FIG. 8, which is a plan view of FIG. 6 along line AA. Each slave gear 73a, . . . , 73f meshes with master gear 68 and it does not contact the remaining slave gears.

In the preferred embodiments, the slave gears have an equal number of teeth or same outside diameter so that the master gear imparts the same rotational speed to each of the slave gears.

Referring back to FIG. 5, the furnace assembly 41 of the shown embodiment is a dehydratation/consolidation furnace and comprises a furnace body and a first heater 44, which is placed in the proximity of the outer surface of the furnace body 42 to heat the inner surface of the furnace body at a given temperature or temperature range. For example, the first heater 42 has a ring shape and is attached to the outer circumference of the cylindrical muffle tube constituting the body of the furnace. The first heater defines a dehydration hot zone 45 indicated in the figure with a dashed line, which is typically but not exclusively at a temperature of nearly 1100° C., for dehydration of the porous layers of the intermediate preforms. The first heater extends along the furnace longitudinal direction and it is positioned in a first longitudinal section of the furnace body 41.

The plurality of intermediate preforms 51 are simultaneously inserted in the furnace body and gradually lowered through the dehydration hot zone 45. During the drying process, each of the plurality of intermediate preforms is rotated about its own axis and one or more drying gases, such as $Cl_2$, are supplied through the inlet 48 of the furnace body.

After dehydration, the plurality of intermediate preforms 51 undergoes to a sintering or consolidation process, in which all intermediate preforms are gradually lowered through a consolidation hot zone, depicted in the figure with dashed line 46, maintained at a temperature higher than that of the drying hot zone, e.g. at nearly 1500° C., by a second heater 47. For example, the second heater 47 has a ring shape and is attached to the outer circumference of the cylindrical muffle tube.

The second heater extends along the furnace longitudinal direction and it is positioned at a second longitudinal section of the furnace body 41, the second longitudinal section being positioned downwards the first longitudinal section surrounded by the first heater 46. The preforms are down driven in the consolidation hot zone 46 at a given rate in order to fully consolidate the preforms from the bottom to the top. By passing through the consolidation hot zone, each partially porous preform shrinks radially (and axially) is vitrified so as to obtain a glass intermediate preform. Such a process is sometimes referred to as gradient consolidation.

Preferably, the glass intermediate preform has a core-to-clad ratio a/c, which is preferably of from 0.20 to 0.30, more preferably of from 0.20 to 0.25.

During consolidation, each of the plurality of intermediate preforms is rotated about its own axis. In this way, the outer surface of each intermediate preform is uniformly exposed to the heat-radiating internal surface of the furnace body. Preferably, the rotational speed of the preforms is constant during the consolidation process and, if present, during the drying process.

It is to be understood that a single heater can be used for both drying and consolidating the intermediate preforms. In that case, a heater is positioned in a upper vertical portion of the furnace and, after completion of dehydration, the heater is moved down the furnace and the temperature is increased up to the consolidation temperature.

In another embodiment (not shown in the figures), the partially porous intermediate preforms are subjected to bulk consolidation, in which the preforms are inserted in a furnace body and remain stationary with respect to the vertical direction of the furnace body while a heater thermally coupled to the furnace body produces a gradient temperature along the vertical direction of the furnace. During bulk consolidation, each preform rotates about its longitudinal axis.

The support structure described in the foregoing embodiments of FIGS. 6 to 8 is configured to house six rotating holding shafts to be operatively connected to respective intermediate preforms. Clearly, this number should not be considered in any way limitative. For example, the support structure can comprise a lower or a larger numbers of holding shafts, in dependence for example on the cross-sectional dimension of the furnace body and/or on the external diameter of the soot intermediate preform.

In some embodiments, the partially porous intermediate preforms which undergo a simultaneous consolidation process have each an outer diameter selected so as to be geometrically compliant with the inner diameter of the consolidation furnace body and preferably selected so as to produce an intermediate glass preform with second core-to-clad ratio of from 0.20 to 0.30. In general, a larger outer diameter of the partially porous intermediate preform allows the insertion of a smaller number of intermediate preforms in the single furnace having a given inner diameter, which often does not exceed 300 mm to ensure a uniform heat in the consolidation hot zone. Furnaces having a muffle body are typically requested to produce uniform heat around the full 360° of the heated inner surface of the muffle.

For example, starting from a glass core rod having an outer diameter of 15 mm and a/b=0.34, and for a typical soot density of about 0.5 g/cm$^3$ for silica soot, the outer diameter of the partially porous intermediate preform is approximately 43 mm for a/c=0.25 and 53 mm for a/c=0.2. A consolidation furnace having an inner diameter of 200 mm can house from 4 to 6 intermediate preforms to be consolidated at the same time.

According to some preferred embodiments, the furnace assembly used for consolidation of multiple intermediate preforms is a standard furnace assembly used for consolidation of single preforms, such as optical fibre-preforms obtained by a single cladding process.

Subsequently to the consolidation of the partially porous intermediate preform, an overcladding region is formed on the intermediate glass preform. Preferably, a soot overclad layer is formed by depositing soot material on the outer circumference of the intermediate glass preform by a flame hydrolysis process. Preferably the overcladding region is formed by an OVD process, in which the intermediate glass preform is placed on a horizontal lathe and deposition of silica soot takes place outside the rotating preform until the desired amount of material, which is related to the desired thickness of overclad region, is grown around the preform.

Once the desired thickness of the soot overclad layer is achieved on the intermediate glass preform, soot deposition for the formation of the soot overclad layer is terminated. The soot overclad layer extends from an interface of the intermediate glass preform to the outermost extent of the soot preform. Preferably, the overclad region is made of pure silica.

Preferably, both the intermediate clad region and the overclad region are formed on the core rod and on the glass intermediate preform, respectively, by direct soot coating.

Preferably the overcladding region is formed by a flame hydrolysis process. In some preferred embodiments, the overcladding region is formed by an OVD process, in which the intermediate glass preform is placed on a horizontal lathe and deposition of silica soot takes place outside the rotating preform until the desired amount of material, which is related to the desired thickness of overclad region, is grown around the preform.

The resulting partially porous preform is sintered in a furnace, which can be a dehydradation-consolidation furnace of the type described with reference to FIG. 5. Due to the typical outside diameter of partially porous optical fibre preforms to obtain single-mode optical fibres, a single final preform is inserted in the furnace body by means of a conventional support structure operatively connected to a vertical driving device. Consolidation produces a glass preform for an optical fibre.

In another embodiment, the overclad layer may be formed by an APVD process, in which fine natural or synthetic silica particles are fed in a plasma flame and heat sintered onto the outer circumference of a rotating intermediate glass perform.

Figure 9:
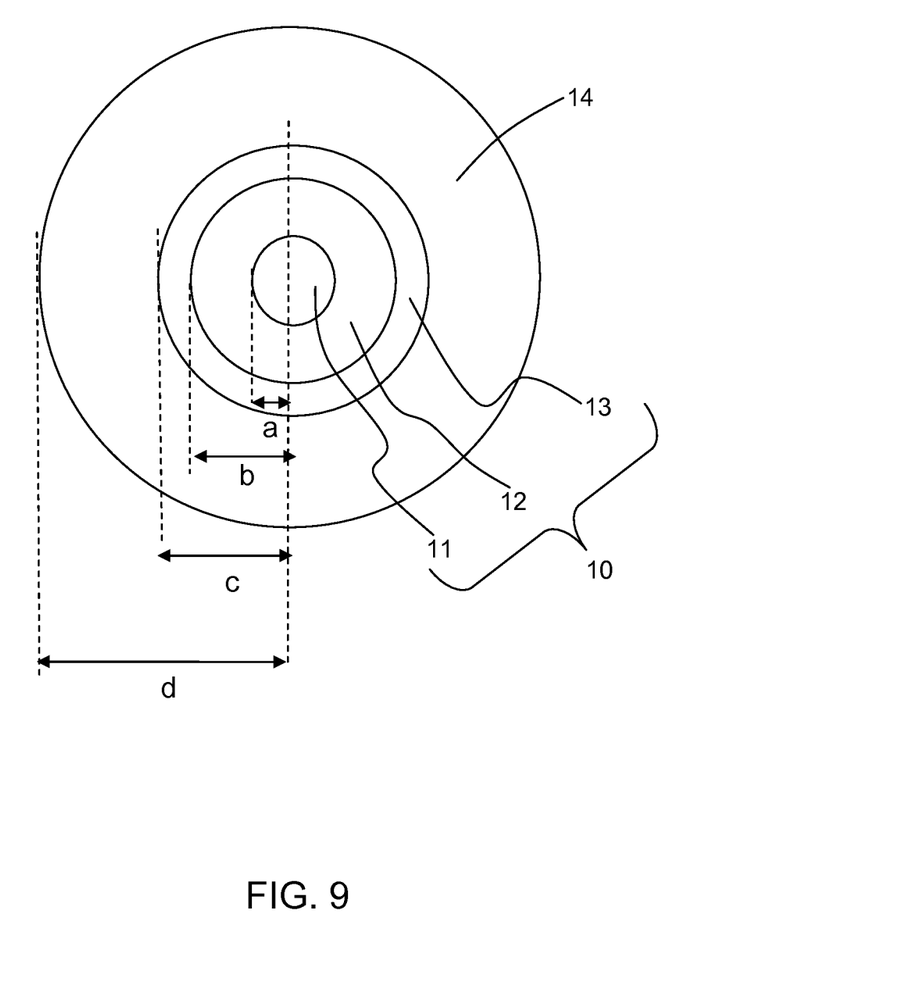
FIG. 9 is a schematic diagram of a cross-sectional view of a glass preform for an optical fibre.

FIG. 9 is a schematic diagram of a cross-sectional view of a glass preform for an optical fibre. Same numbers of those of FIG. 2 are used to refer to like features. An overclad region 14 surrounds the intermediate clad region 13. The final core-to-clad ratio a/d can be selected so as to obtain, after drawing, an optical fibre having a standard outer diameter according to the specifications for single-mode transmissions, i.e. of about 125 μm. For example, a/d is of about 0.08.

Measurements (not shown) of the relative refractive index profile on a plurality of glass optical fibre preforms obtained by the method consistent with the present disclosure and having an overcladding of pure silica typically showed no significant discontinuity at the interface between the outer surface of the intermediate clad region and the overclad region implying that the glass quality of the two regions was substantially the same.

Following the formation of a glass preform for optical fibre, in the usual ways, the glass optical fibre preform is lowered at a relatively low speed into a drawing tower including a furnace having a hot zone where it is heated at a melting temperature (typically, at a temperature within the range 2000° C.-2200° C.) in the neck-down region, where glass softens and it is submitted to reduction in cross-sectional area to the desired cross-sectional area of the fibre. From the lower tip of the neck-down region, the optical fibre emerges where it is gripped by a mechanical device and wound in one or more reels.

EXAMPLES

Comparative Example 1

Nearly 11,000 grams of silica soot were deposited in order to form a soot overclad layer by using an OVD process using as reactant octamethylcyclotetrasiloxane (OMCTS), referred also to as D4, onto a $GeO_2$-doped silica glass core rod with a step index profile. The glass rod was had a length of about 1.35 meter, a diameter of about 14.4 mm and a core-to-clad ratio a/b=0.343. The partially porous optical fibre preform was dehydrated by maintaining the preform in a hot zone of dehydration-consolidating furnace at about 1100° C., for 120 minutes in a 15 l/min He+0.9 l/min $Cl_2$ flow, with a rotational speed of 1 turn/min in order to assure axial symmetry. Then, the soot overclad layer was sintered by down driving the partially porous preform in a hot zone at 1500° C. of the consolidating furnace at a downfeed rate of 7 mm/min in an He+$Cl_2$ atmosphere having the same gas flow rate used in the dehydration, while rotating the preform with a rotational speed of 1 turn/min.

The preform was then placed for 12 h in a holding oven at 1000° C. with nitrogen.

The preform was drawn on a standard drawing tower. The outer diameter of the drawn fibre was maintained at 125±1 microns during drawing. Optical properties of several optical fibre length sections, which were wound up in respective bobbins were measured. In all examples herein described, the mode field diameter (MFD) of an optical fibre was measured according to the IEC 60793-1-45 (July 2001) standard, at a wavelength of 1310 nm. The average value of MFD was 9.21 μm, conforming to G.652 standard.

Spectral attenuation measurements were performed on several bobbins of optical fibres by using a commercial PK 2200 measurement bench. Measured average attenuation values were:
  Attenuation @1310 nm=0.329 dB/km
  Attenuation @1380 nm=0.341 dB/km
  Attenuation @1550 nm=0.191 dB/km Example 1

A soot intermediate clad layer was formed by depositing nearly 600 grams of silica soot by an OVD process (D4 reactant) onto a $GeO_2$-doped silica glass rod (of about 1.35 meter length and of about 14.4 mm diameter) with a core step index profile, a silica inner clad a and a first core-to-clad ratio, a/b, of 0.348. The obtained partially porous intermediate preform was suspended to a conventional support structure (not shown in the figures) configured to hold a single preform. The preform was then inserted in a dehydration/consolidation furnace and maintained in a first hot zone of the furnace for dehydration at about 1100° C. for 120 minutes in a He+$Cl_2$ atmosphere with gas flow rate of 15 l/min He+0.9 l/min $Cl_2$. During the dehydration process, the intermediate preform was uniformly rotated at a rotational speed of 1 turn/min. Subsequently, the soot intermediate clad layer was sintered by down driving the preform in a second hot zone at 1500° C. of the furnace at a downfeed rate of 7 mm/min in the same He+$Cl_2$ atmosphere used for the dehydration process, while rotating the preform at a rotational speed of 1 turn/min. The preform was then placed for 12 h in a holding oven at 1000° C. in which nitrogen was flown.

The resulting intermediate glass preform had a second core-to-clad ratio, a/c, of 0.23.

A soot overclad layer was formed by depositing nearly 10,800 grams of silica soot by OVD (D4 reactant) onto the intermediate glass preform. After deposition of the overclad soot, the partially porous preform was dried and sintered in the same He+$Cl_2$ atmosphere used in the dehydration/consolidating process of the intermediate preform and carried out by using the same process parameters.

The sintered preform was then placed for 12 h in a holding oven at 1000° C. with nitrogen and subsequently drawn on a standard drawing tower. The fibre outer diameter was maintained at 125±1 microns. Optical properties of several fibre length sections, which were wound up in respective bobbins were measured. Averaged values of the measured optical properties were:
  Zero wavelength dispersion=1313 nm
  MFD @1310 nm=9.41 μm
  Cabled cut-off wavelength=1194 nm Spectral attenuation measurements were performed on several bobbins of optical fibres by using a commercial PK 2200 measurement bench. Measured average attenuation values were:
  Attenuation @1310 nm=0.331 dB/km
  Attenuation @1380 nm=0.290 dB/km
  Attenuation @1550 nm=0.194 dB/km The use of the double cladding process starting with a core rod having an a/b ratio close to that of Comparative example 1 allows to obtain an optical fibre with very small water contribution, as seen from the low value of the optical attenuation at 1380 nm.

Comparative Example 2

Three porous intermediate preforms were formed by depositing nearly 600 grams of silica soot by an OVD process using D4 as reactant onto a respective plurality of $GeO_2$-doped silica glass rods having the same step-index profile and physical dimensions as those in Example 1 and first core-to clad diameter, a/b, ranging from 0.34 to 0.35.

Three partially porous intermediate preforms were hung on a single-shaft support structure (not shown in the figures), which was provided with a central shaft rotatably connected to a vertical driving device and configured to rotate about an axis central with respect to the preforms. To this end, intermediate preforms were suspended on respective holding positions of a plate integral with the central shaft and thus subject to the rotational movement of the shaft. As in the arrangement shown in FIG. 4a, preforms were hung at an angular distance of 120°. The partially porous intermediate preforms were inserted in a dehydration/consolidation furnace and were submitted to a dehydration process followed by a consolidation process substantially under the same conditions used in previous Example 1. During the drying process and the consolidation process, the intermediate preforms rotated simultaneously around the common central axis (as shown in FIG. 4a) and uniformly at a rotational speed of 1 turn/min.

At the end of the consolidation process, all three glass intermediate preforms were visibly bent, with a bow degree of more than 10 mm per meter of length of intermediate preform.

Bent core-rods covered with overclad are known to turn out to produce fibers having unacceptably high core-clad concentricity error.

Example 2

Six partially porous intermediate preforms were formed by depositing by means of OVD a similar amount of silica soot of previous Comparative Example 2 under substantially the same conditions. Differently from Comparative Example 2, the porous intermediate preforms were then suspended on respective connecting rods operatively connected to a support structure of the type described with reference to FIGS. 6 to 8.

The partially porous intermediate preforms mounted on the support structure were inserted in a dehydration/consolidation furnace and subjected to a dehydration and consolidation process under the same conditions described in the Comparative Examples 1 and 2. Differently from the Comparative Example 2, each preform uniformly rotated at 1 turn/min about its longitudinal axis.

At the end of the consolidation process, all six glass intermediate preforms were substantially straight, with a bow degree of less than 0.5 mm across a length of intermediate preform of 1.0-1.5 meter. Such small values of bending of the preforms are known to provide optical fibres with acceptable, good values of core-clad concentricity.

The resulting intermediate glass preforms had a second core-to-clad ratio a/c of less than 0.30 and in particular of about 0.25.

Completion of the manufacturing process of each intermediate glass preform to produce an optical fibre by using the same conditions of deposition of an overclad layer and dehydration/consolidation process of Example 1 is expected to produce optical fibres having optical properties equivalent to those of Example 1, namely optical fibres with low attenuation at 1380 nm, thereby having low water contamination.

The invention claimed is:

1. A method of manufacturing an optical fibre preform comprising:
   providing a plurality of partially porous intermediate preforms, each partially porous intermediate preform having a longitudinal axis and comprising a respective soot intermediate clad layer formed around a respective glass core rod comprising a central core region of radius a and an inner clad region of external radius b to define a first core-to-clad ratio a/b;
   operatively connecting the plurality of partially porous intermediate preforms to a respective plurality of holding shafts comprised in a support structure comprising a support member, each of the plurality of holding shafts being rotatably engaged to the support member
   consolidating the formed soot intermediate clad layers to form a respective plurality of intermediate glass preforms, each of the plurality of intermediate glass preforms comprising an intermediate clad region of external radius c to define a second core-to-clad ratio a/c of from 0.20 to 0.30; and
   overcladding at least one intermediate glass preform by forming an overclad region surrounding the intermediate clad region to form an optical fibre glass preform, wherein consolidating comprises exposing the plurality of partially porous intermediate glass preforms to a consolidation hot zone of a single furnace body while rotating each of the plurality of partially porous intermediate preforms about its respective longitudinal axis, wherein:
   the plurality of holding shafts are arranged peripherally with respect to a drive shaft transmitting rotation to the plurality of holding shafts by means of a slave driving mechanism.

2. The method of claim 1,
   wherein the plurality of holding shafts are geared shafts disposed concentrically around the drive shaft transmitting rotation to the plurality of holding shafts by means of a rotation transmission mechanism.

3. The method of claim 2, wherein the plurality of holding shafts are interlocked with a respective slave gear meshing with a master gear interlocked with the drive shaft.

4. The method of claim 1, wherein the furnace body is vertically oriented and consolidating comprises simultaneously moving the plurality of partially porous intermediate glass preforms relative to the consolidation hot zone along a longitudinal direction of the furnace.

5. The method of claim 1, wherein rotating each of the plurality of partially porous intermediate glass preforms comprises uniformly rotating each of the plurality of partially porous intermediate preforms at an equal rotational speed.

6. The method of claim 1, wherein providing a plurality of partially porous intermediate preforms comprises:
   providing a respective plurality of glass core rods, each glass core rod having a first core-to-clad ratio a/b, and
   depositing soot material around each glass core rod by a flame hydrolysis process to form a soot intermediate clad layer surrounding the inner clad region.

7. The method of claim 6, wherein the soot material deposited around each glass core rod is silica soot.

8. The method of claim 6, wherein the flame hydrolysis deposition process is an outside vapour deposition process.

9. The method of claim 1, wherein the core-to-clad ratio a/b is equal to or less than 0.40.

10. The method of claim 1, wherein overcladding the at least one intermediate glass preform comprises:
    depositing soot material around the intermediate glass preform by a flame hydrolysis process to form a soot overclad layer, and
    consolidating the soot overclad layer so as to form an optical fibre preform.

11. The method of claim 10, wherein the flame hydrolysis deposition process is an outside vapour deposition process.

12. The method of claim 1, further comprising the step of drawing the optical fiber preform to fabricate an optical fiber.

* * * * *